(12) United States Patent
Lin

(10) Patent No.: US 8,283,579 B2
(45) Date of Patent: Oct. 9, 2012

(54) WATER-PROOF JUNCTION BOX AND WATER-PROOF CONNECTOR ASSEMBLY

(75) Inventor: Chih-Hsin Lin, Xianxi Township, Changhua County (TW)

(73) Assignee: K.S. Terminals Inc., Changhua County (TW)

( * ) Notice: Subject to any disclaimer, the term of this patent is extended or adjusted under 35 U.S.C. 154(b) by 331 days.

(21) Appl. No.: 12/849,156

(22) Filed: Aug. 3, 2010

(65) Prior Publication Data
US 2011/0309071 A1 Dec. 22, 2011

(30) Foreign Application Priority Data
Jun. 22, 2010 (TW) .............................. 99211772 U

(51) Int. Cl.
*H02G 3/08* (2006.01)
*F16L 25/00* (2006.01)
(52) U.S. Cl. ............................ 174/657; 174/93; 174/651
(58) Field of Classification Search ................... 174/651
See application file for complete search history.

(56) References Cited

U.S. PATENT DOCUMENTS

| | | | | |
|---|---|---|---|---|
| 5,951,327 A * | 9/1999 | Marik | ....................... | 439/607.44 |
| 6,034,325 A * | 3/2000 | Nattel et al. | ..................... | 174/59 |
| 6,702,336 B1 * | 3/2004 | Chelchowski et al. | ........ | 285/343 |
| 6,730,849 B2 * | 5/2004 | Koessler | .......................... | 174/93 |
| 7,431,343 B2 * | 10/2008 | Chiu | ........................... | 285/151.1 |
| 2004/0090067 A1 * | 5/2004 | Pridham | ........................ | 285/328 |

* cited by examiner

*Primary Examiner* — Timothy Thompson
*Assistant Examiner* — Hiram E Gonzalez
(74) *Attorney, Agent, or Firm* — Ming Chow; Sinorica, LLC

(57) ABSTRACT

A water-proof junction box and a water-proof connector assembly therein are provided. The water-proof junction box includes a junction box body, a junction box cover and at least one water-proof connector assembly deposited at a lateral of the junction box body. The water-proof connector assembly includes a tube, a water-blocking sleeve, a pressing element and a fastening element, all of a cannular shape. Therein, the tube and the junction box body are integrated, and the tube has an externally threaded portion. The water-blocking sleeve is for being inserted into the tube and has a flange as well as a sleeve portion. The pressing element is for being mounted around the sleeve portion of the water-blocking sleeve. The fastening element is internally formed with an internally threaded portion for screwingly coupling the externally threaded portion of the tube.

8 Claims, 5 Drawing Sheets

WATER-PROOF JUNCTION BOX AND WATER-PROOF CONNECTOR ASSEMBLY

BACKGROUND OF THE INVENTION

1. Technical Field

The present invention relates to a junction box and a connector assembly used therewith. More particularly, the junction box and the connector assembly possess water-proof capability.

2. Description of Related Art

In view of the global energy crisis, more attention has been paid to the applications of solar cells from the governments and the private segment. Solar is inexhaustible and incurs no environmental pollution when converted into electricity, so it has become a popular alternative energy. This stimulates the vigorous development of solar-cell related industries. Since a single solar cell generates relatively small voltage and current, a junction box is required to connect plural solar cell in series or parallel so as to give out a relatively large voltage and current, for meeting the overall power-generating efficiency to the particular usage.

However, at sites where solar cells and junction boxes, due to the weather and other factors, water is likely to permeate into the solar cells with the guide of connecting lines. This can make the solar cells have short circuits and breakdowns or even become unusable, bringing about troubles to the users and related dealers. Therefore, junction boxes and connector assemblies having water-proof capability are necessary to solar cells. Moreover, when attached to solar cells, if a power line is twisted or dragged, it can be damaged and then cause adverse effect on the stability of the output power of the solar cells.

SUMMARY OF THE INVENTION

For overcoming the aforementioned shortcomings of the prior art, the present invention provides a water-proof connector assembly, which includes a tube, a water-blocking sleeve, a pressing element and a fastening element, all of a cannular shape. The water-blocking sleeve is for being inserted into the tube, and the water-blocking sleeve has a flange as well as a sleeve portion. The flange is for abutting against the first abutting portion and the second cannular section of the tube. The flange has an outer diameter greater than that of the sleeve portion. The pressing element is for being mounted around the sleeve portion of the water-blocking sleeve, and has successively a first segment, a second segment and a third segment. The first segment is for abutting against the flange of the water-blocking sleeve and the third cannular section of the tube. The first segment further has at least one projecting retaining portion, which is for being wedged into the recess. When the retaining portion is wedged into the recess, a locked, anti-slip combination is formed so that when the power line and the water-proof connector assembly are combined, the power line is restricted from rotation with respect to the water-proof connector assembly and thereby prevented from being twisted and dragged.

The second segment is for abutting against a terminal of the tube, and the second segment has an outer diameter greater than both that of the first segment and that of the third segment. The third segment has a plurality of axial slits and a plurality of elastic wings. Each said elastic wing has first raised portions and second raised portions. The first raised portions and the second raised portions each have an inclined surface. In addition, an outer diameter defined by the first raised portions is greater than that defined by the second raised portions. The fastening element has its inner wall successively formed with an internally threaded portion, a third raised portion and a fourth raised portion. Therein, the internally threaded portion is for screwingly coupling the externally threaded portion of the tube, and the third raised portion is for abutting against the first raised portions of the pressing element while the fourth raised portion is for abutting against the second raised portions of the pressing element. The third raised portion has an inner diameter smaller than the outer diameter defined by the first raised portions, so as to provide the first-stage close fit. The fourth raised portion has an inner diameter smaller than the outer diameter defined by the second raised portions, so as to provide the second-stage close fit.

Therefore, the primary objective of the present invention is to provide the above-described water-proof connector assembly, wherein the combination, fit and pressing between the tube, the water-blocking sleeve, the pressing element and the fastening element block water from entering a solar cell associated with the water-proof connector assembly, thereby endowing the solar cell with water-proof capability.

Another objective of the present invention is to provide the above-described water-proof connector assembly, wherein the first-stage close fit formed by the third raised portion and the first raised portions and the second-stage close fit formed by the fourth raised portion and the second raised portions jointly hold a power line firmly, so as to prevent the power line from being twisted and dragged when the fastening element and the tube are combined, thereby ensuring the power-generating function of the solar cell.

In addition, the present invention also provides a water-proof junction box, which includes a junction box body, a junction box cover and at least one water-proof connector assembly deposited at a lateral of the junction box body. The water-proof connector assembly has a tube, a water-blocking sleeve, a pressing element and a fastening element, all of a cannular shape. Therein, the tube and the junction box body are integrated, and a first cannular section of the tube is intercommunicated with an interior of the junction box body. The water-blocking sleeve is for being inserted to the tube, and has a flange as well as a sleeve portion. The flange is for abutting against the first abutting portion and the second cannular section of the tube. The flange has an outer diameter greater than that of the sleeve portion. The pressing element is for being mounted around the sleeve portion of the water-blocking sleeve, and has successively a first segment, a second segment and a third segment. The first segment is for abutting against the flange of the water-blocking sleeve and the third cannular section of the tube. The first segment further has at least one projecting retaining portion, which is for being wedged into the recess. When the retaining portion is wedged into the recess, a locked, anti-slip combination is formed so that when the power line and the water-proof connector assembly are combined, the power line is restricted from rotation with respect to the water-proof connector assembly and thereby prevented from being twisted and dragged.

The second segment is for abutting against a terminal of the tube, and the second segment has an outer diameter greater than both that of the first segment and that of the third segment. The third segment has a plurality of axial slits and a plurality of elastic wings. Each said elastic wing has first raised portions and second raised portions. The first raised portions and the second raised portions each have an inclined surface. In addition, an outer diameter defined by the first raised portions is greater than that defined by the second raised portions. The fastening element has its inner wall successively formed with an internally threaded portion, a third raised portion and a fourth raised portion. Therein, the internally threaded portion is for screwingly coupling the externally threaded portion of the tube, and the third raised portion is for abutting against the first raised portions of the pressing element while the fourth raised portion is for abutting against the second raised portions of the pressing element. The third raised portion has an inner diameter smaller than the outer diameter defined by the first raised portions, so as to provide the first-stage close fit. The fourth raised portion has an inner diameter smaller than the outer diameter defined by the second raised portions, so as to provide the second-stage close fit.

Therefore, the primary objective of the present invention is to provide the above-described water-proof junction box, wherein the combination, fit and pressing between the tube, the water-blocking sleeve, the pressing element and the fastening element block water from entering a solar cell associated with the water-proof connector assembly, thereby endowing the solar cell with water-proof capability.

Another objective of the present invention is to provide the above-described water-proof junction box, wherein the first-stage close fit formed by the third raised portion and the first raised portions and the second-stage close fit formed by the fourth raised portion and the second raised portions jointly hold a power line firmly, so as to prevent the power line from being twisted and dragged when the fastening element and the tube are combined, thereby ensuring the power-generating function of the solar cell.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

While the present invention discloses a water-proof junction box and a water-proof connector assembly, the electrical principles and wiring for solar cells implemented therein have been known to people of ordinary skill in the art and need not to be discussed in any length herewith. Also, the accompanying drawings referred by the following description are intended to show the characteristics of the present invention and are not made to scale.

Figure 1A:
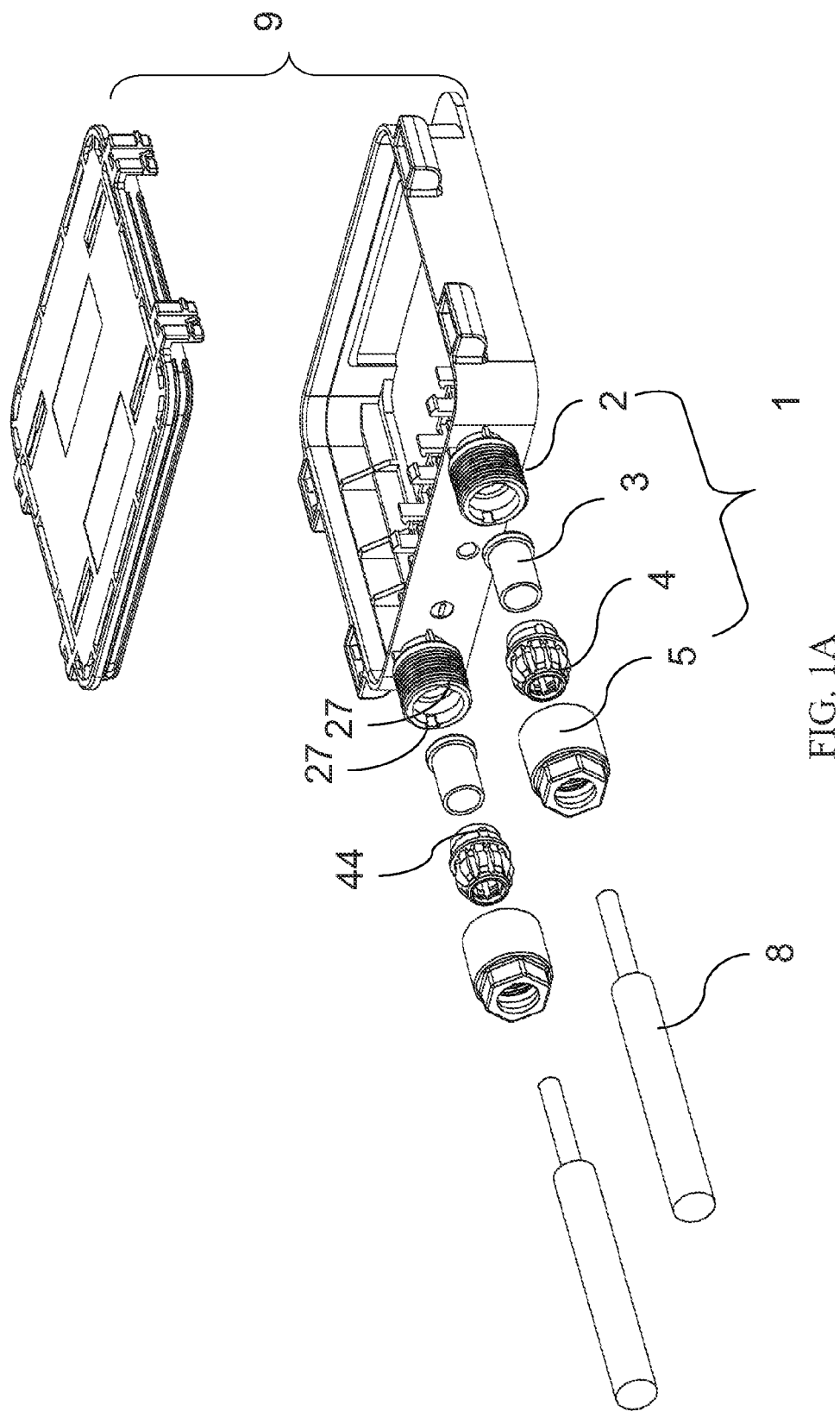
FIG 1A is an exploded view of a water-proof connector assembly according to a first preferred embodiment of the present invention.
Figure 1B:
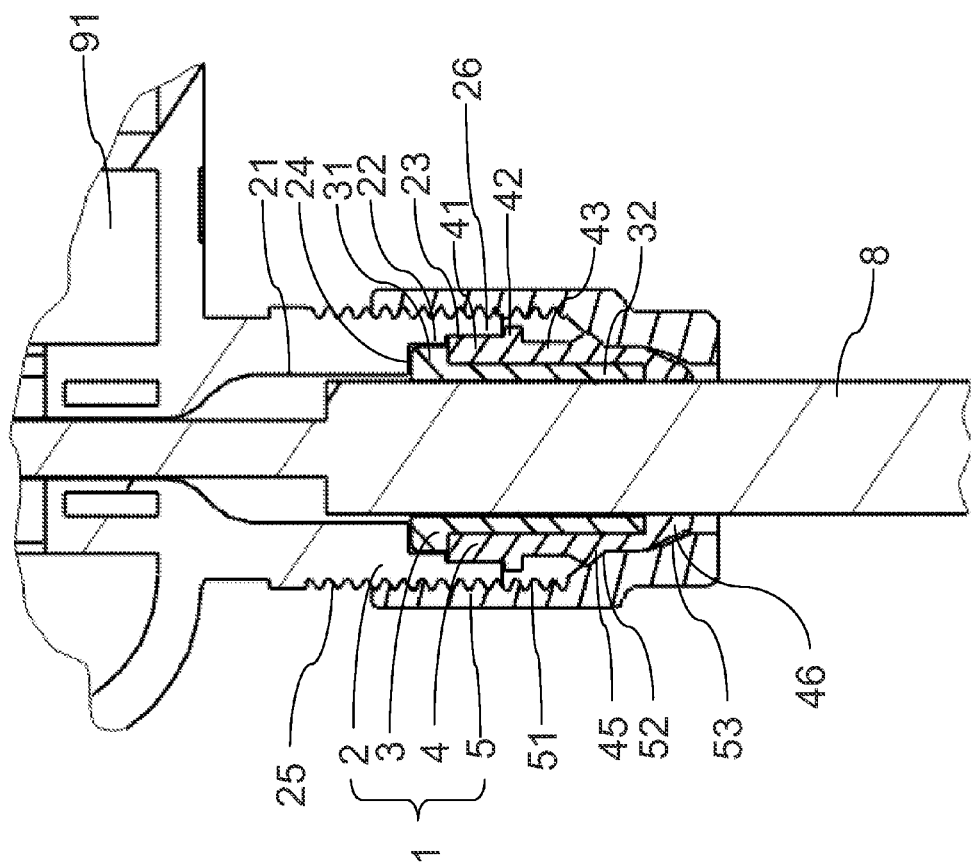
FIG. 1B is a cross-sectional view of the water-proof connector assembly according to the first preferred embodiment of the present invention.

FIG 1A is an exploded view of a water-proof connector assembly according to a first preferred embodiment of the present invention. The water-proof connector assembly 1 is to be assembled in a water-proof junction box 9. The water-proof connector assembly 1 comprises a tube 2, a water-blocking sleeve 3, a pressing element 4 and a fastening element 5. The tube 2, the water-blocking sleeve 3, the pressing element 4 and the fastening element 5 are all of a cannular shape. The tube 2 has an inner wall formed with at least one recess 27. In the first preferred embodiment, there are two said recesses 27 facing each other. The pressing element 4 has at least one projecting retaining portion 44 for being wedged into the recess 27. The retaining portion 44 is configured to be held and positioned by the recess 27. FIG. 1B is a cross-sectional view of the water-proof connector assembly 1 according to the first preferred embodiment of the present invention. The tube 2 has its inner wall formed with a first cannular section 21, a second cannular section 22 and a third cannular section 23. A first abutting portion 24 is defined between the first cannular section 21 and the second cannular section 22. The tube 2 further has its outer wall formed with an externally threaded portion 25. Moreover, the tube 2 has a terminal 26 opposite to the first cannular section 21. The water-blocking sleeve 3 is inserted to the tube 2. And the water-blocking sleeve 3 is made of rubber. The water-blocking sleeve 3 has a flange 31 and a sleeve portion 32. The flange 31 abuts against the first abutting portion 24 and the second cannular section 22 of the tube 2. Therein, the flange 31 has an outer diameter greater than that of the sleeve portion 32.

Figure 1C:
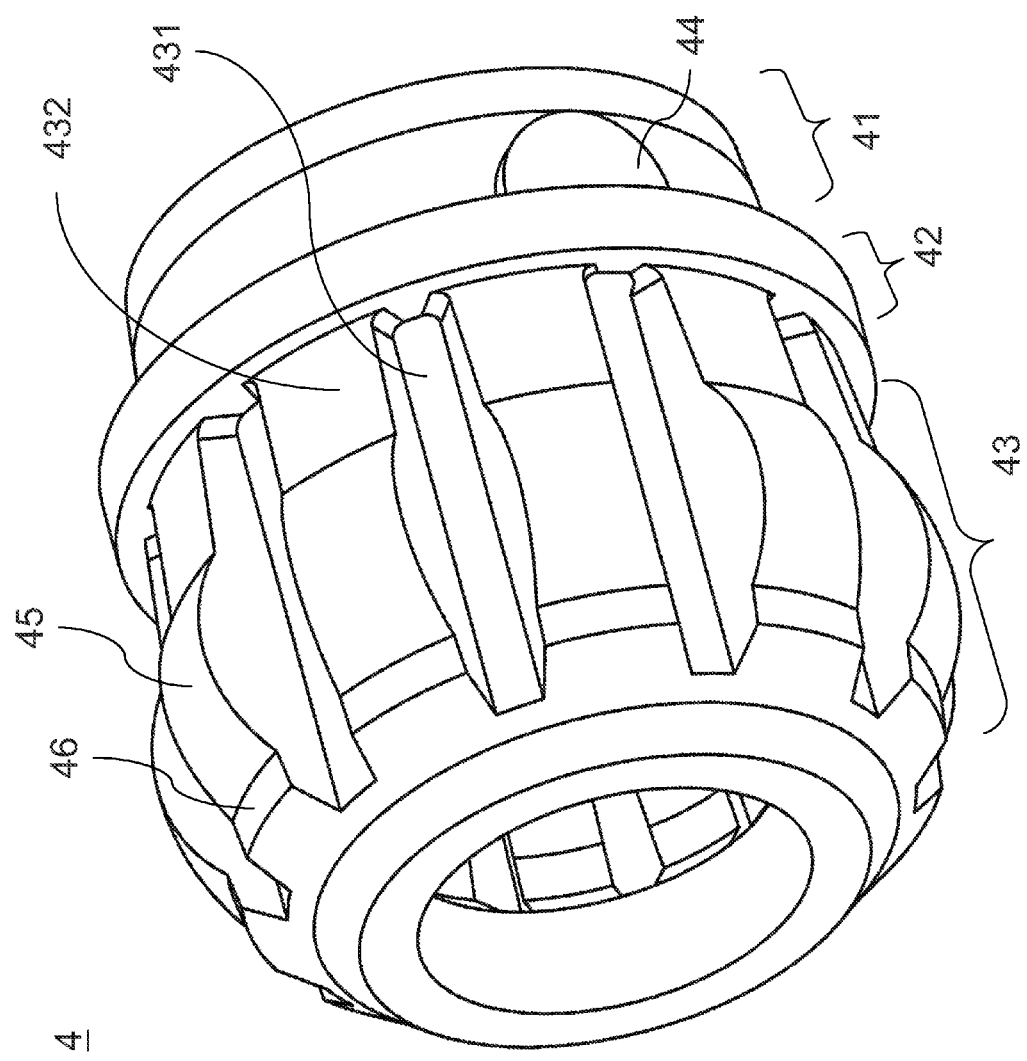
FIG. 1C is an enlarged perspective view of a pressing element of the water-proof connector assembly according to the first preferred embodiment of the present invention.

Referring to FIG. 1B and FIG. 1C together, the pressing element 4 is mounted around the sleeve portion 32 of the water-blocking sleeve 3 and has successively a first segment 41, a second segment 42 and a third segment 43. The first segment 41 abuts against the flange 31 of water-blocking sleeve 3 and the third cannular section 23 of the tube 2. The second segment 42 abuts against the terminal 26 of the tube 2. Therein, the second segment 42 has an outer diameter greater than both that of the first segment 41 and that of the third segment 43. The third segment 43 has a plurality of axial slits 431 and a plurality of elastic wings 432. Each of the elastic wings 432 has a first raised portion 45 and a second raised portion 46. Therein, the first raised portions 45 and the second raised portions 46 each have an inclined surface. Specifically, the inclination of the inclined surface of first raised portion 45 is greater than that of the inclined surface of the second raised portion 46. In addition, the first raised portions 45 defines an outer diameter greater than that defined by the second raised portions 46.

Staying with FIG. 1B, the fastening element 5 has its inner wall successively formed with an internally threaded portion 51, a third raised portion 52 and a fourth raised portion 53. Therein, the internally threaded portion 51 is for screwingly combining the externally threaded portion 25 of the tube 2, and the third raised portion 52 is for abutting against the first raised portion 45 of the pressing element 4 while the fourth raised portion 53 is for abutting against the second raised portions 46 of the pressing element 4. Since the inner diameter defined by the third raised portion 52 is smaller than the outer diameter defined by the first raised portions 45, when the fastening element 5 and the pressing element 4 are assembled, the third raised portion 52 presses upon the first raised portions 45 to produce the first-stage close fit, and this in turn makes the pressing element 4 compressed. Furthermore, since the inner diameter defined by the fourth raised portion 53 is smaller than the outer diameter defined by the second raised portions 46, when the fastening element 5 and the pressing element 4 are assembled, the fourth raised portion 53 presses upon the second raised portions 46, causing the second-stage close fit, thereby making the pressing element 4 further compressed. When a power line 8 is connected to the junction box body 91 through the water-proof connector assembly 1, the fastening element 5 and the tube 2 are screwingly fixed together by means of the internally threaded portion 51 of the fastening element 5 and the externally threaded portion 25 of the tube 2. Meantime, the first-stage close fit formed by the third raised portion 52 and the first raised portions 45 as well as the second-stage close fit formed by the fourth raised portion 53 and the second raised portions 46 that compress the pressing element 4 in turn firmly hold the power line 8 received in the pressing element 4, so as to position the power line 8 well. By the combination, fit and pressing between the tube 2, the water-blocking sleeve 3, the pressing element 4 and the fastening element 5, water is blocked from entering, thereby achieving the water-proof capability.

Moreover, as described above, the fastening element 5 has the internally threaded portion 51 for coupling the externally threaded portion 25 of the tube 2 so as to achieve combination between the fastening element 5 and the tube 2, and in the course of combination, the first-stage close fit formed between the first raised portions 45 and the third raised portion 52 together with the second-stage close fit formed between the second raised portions 46 and the fourth raised portion 53 forces the pressing element 4 to hold the power line 8 tightly. In view of that during the combination, rotation of the fastening element 5 is likely to draw the pressing element 4 together with the power line 8 to rotate synchronously and causes the twisted power line 8, the present invention provides the pressing element 4 with at least one said projecting retaining portion 44 for being wedged into the recess 27. In other words, the retaining portion 44 of the pressing element 4 and the recess 27 of the tube 2 are mutually wedged (referring to FIG. 1A). As a result, the pressing element 4 is positioned in the tube 2, so that the pressing element 4 and the power line 8 are independent of the rotation of the fastening element 5, which is combining the tube 2, thereby ensuring the good function of the associated solar cell.

Figure 2A:
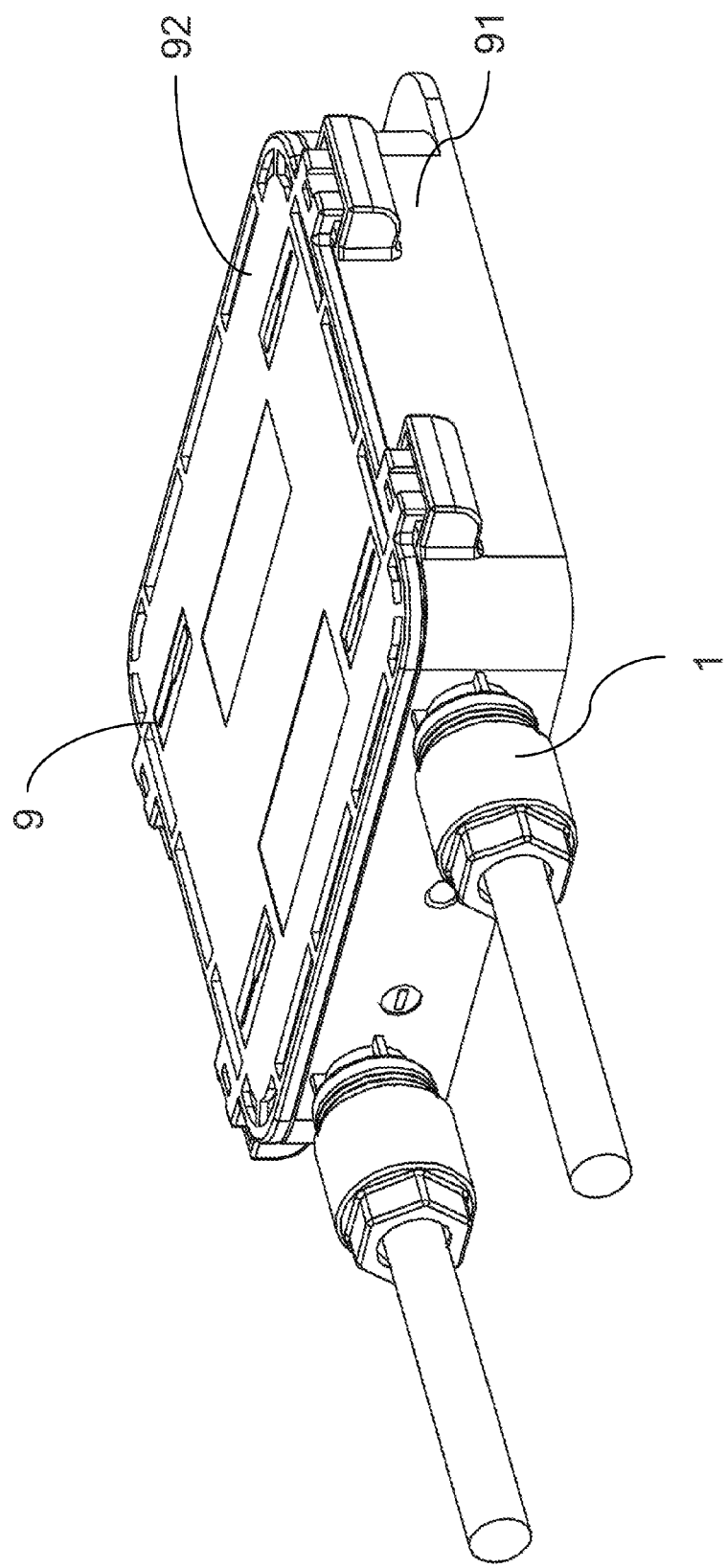
FIG. 2A is a perspective view of a water-proof junction box according to a second preferred embodiment of the present invention.

In addition to the foregoing water-proof connector assembly 1, the present invention further provides a water-proof junction box 9 containing the water-proof connector assembly 1. FIG. 2A is a perspective view of the water-proof junction box 9 according to a second preferred embodiment of the present invention. The water-proof junction box 9 includes a junction box body 91, a junction box cover 92, and at least one said water-proof connector assembly 1 deposited at one lateral of the junction box body 91.

In the present preferred embodiment, two of said water-proof connector assemblies 1 are provided exemplificatively. Each of the water-proof connector assembly 1 has the constructive components, connections between the components and structural features identical to those described in the first preferred embodiment, and repeated description is omitted herein.

Figure 2B:
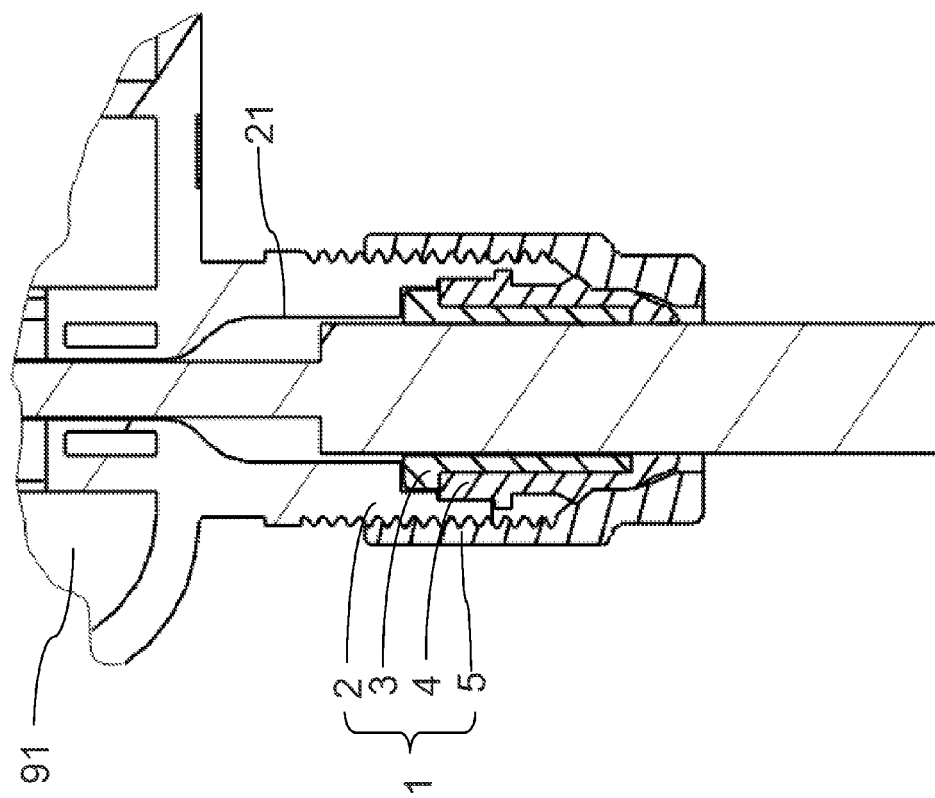
FIG. 2B is a partial, cross-sectional view of the water-proof junction box according to the second preferred embodiment of the present invention.

In addition, FIG. 2B is a partial, cross-sectional view of the water-proof junction box 9 according to the second preferred embodiment of the present invention (referring to FIG. 2A). Preferably, the tube 2 of the water-proof connector assembly 1 is integrated with the junction box body 91 of the water-proof junction box 9 (referring to FIG. 2A), and the first cannular section 21 of the tube 2 is intercommunicated with an interior of the junction box body 91.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is
1. A water-proof connector assembly (1) comprising a tube (2), a water-blocking sleeve (3), a pressing element (4) and a fastening element (5), each of which is of a cannular shape, the water-proof connector assembly being characterized in:
the tube (2) having a first cannular section (21), a second cannular section (22), a third cannular section (23) and a terminal (26), the first cannular section (21) and the second cannular section (22) defining a first abutting portion (24) therebetween, and the tube (2) having an outer wall formed with an externally threaded portion (25);
the water-blocking sleeve (3) being inserted into the tube (2) and having a flange (31) and a sleeve portion (32), the flange (31) abutting against the first abutting portion (24) and the second cannular section (22) of the tube (2), and the flange (31) having an outer diameter greater than an outer diameter of the sleeve portion (32);
the pressing element (4) being mounted around the sleeve portion (32) of the water-blocking sleeve (3), and having successively a first segment (41), a second segment (42) and a third segment (43), the first segment (41) abutting against the flange (31) of the water-blocking sleeve (3) and the third cannular section (23) of the tube (2), the second segment (42) abutting against the terminal (26) of the tube (2), the second segment (42) has an outer diameter greater than an outer diameter of the first segment (41) and an outer diameter of the third segment (43), the third segment (43) having a plurality of axial slits (431) and a plurality of elastic wings (432), each said elastic wing (432) having a first raised portion (45) and a second raised portion (46), and an outer diameter defined by the first raised portions (45) is greater than an outer diameter defined by the second raised portions (46);
the fastening element (5) has an inner wall formed successively with an internally threaded portion (51), a third raised portion (52) and a fourth raised portion (53), the internally threaded portion (51) screwingly coupling the externally threaded portion (25) of the tube (2), the third raised portion (52) abutting against the first raised portions (45) of the pressing element (4), the fourth raised portion (53) abutting against the second raised portions (46) of the pressing element (4), an inner diameter of the third raised portion (52) being smaller than the outer diameter defined by the first raised portions (45), and an inner diameter of the fourth raised portion (53) being smaller than the outer diameter defined by the second raised portions (46).

2. The water-proof connector assembly (1) of claim 1, wherein the tube (2) has an inner wall formed with at least one recess (27), and the first segment (41) of the pressing element (4) further has at least one projecting retaining portion (44) for being wedged into the recess (27).

3. The water-proof connector assembly (1) of claim 1, wherein the first raised portion (45) of the pressing element (4) has an inclined surface.

4. The water-proof connector assembly (1) of claim 1, wherein the second raised portion (46) of the pressing element (4) has an inclined surface.

5. The water-proof connector assembly (1) of claim 1, wherein the water-blocking sleeve (3) is made of rubber.

6. A water-proof junction box (9), including a junction box body (91), a junction box cover (92) and at least one water-proof connector assembly (1) deposited at one lateral of the junction box body (91), wherein the water-proof connector assembly (1) comprises a tube (2), a water-blocking sleeve (3), a pressing element (4) and a fastening element (5), each of which is of a cannular shape, and the water-proof connector assembly is characterized in:

the tube (2) having a first cannular section (21), a second cannular section (22), a third cannular section (23) and a terminal (26), the first cannular section (21) and the second cannular section (22) defining a first abutting portion (24) therebetween, and the tube (2) having an outer wall formed with an externally threaded portion (25);

the water-blocking sleeve (3) being inserted into the tube (2) and having a flange (31) and a sleeve portion (32), the flange (31) abutting against the first abutting portion (24) and the second cannular section (22) of the tube (2), and the flange (31) having an outer diameter greater than an outer diameter of the sleeve portion (32);

the pressing element (4) being mounted around the sleeve portion (32) of the water-blocking sleeve (3), and having successively a first segment (41), a second segment (42) and a third segment (43), the first segment (41) abutting against the flange (31) of the water-blocking sleeve (3) and the third cannular section (23) of the tube (2), the second segment (42) abutting against the terminal (26) of the tube (2), the second segment (42) has an outer diameter greater than an outer diameter of the first segment (41) and an outer diameter of the third segment (43), the third segment (43) having a plurality of axial slits (431) and a plurality of elastic wings (432), each said elastic wine (432) having a first raised portion (45) and a second raised portion (46), and an outer diameter defined by the first raised portions (45) is greater than an outer diameter defined by the second raised portions (46);

the fastening element (5) has an inner wall formed successively with an internally threaded portion (51), a third raised portion (52) and a fourth raised portion (53), the internally threaded portion (51) screwingly coupling the externally threaded portion (25) of the tube (2), the third raised portion (52) abutting against the first raised portions (45) of the pressing element (4), the fourth raised portion (53) abutting against the second raised portions (46) of the pressing element (4), an inner diameter of the third raised portion (52) being smaller than the outer diameter defined by the first raised portions (45), and an inner diameter of the fourth raised portion (53) being smaller than the outer diameter defined by the second raised portions (46); and a first cannular section (21) of the tube (2) is intercommunicated with an interior of the junction box body (91).

7. The water-proof junction box (9) of claim 6, wherein the tube (2) and the junction box body (91) are integrated.

8. The water-proof junction box (9) of claim 6, wherein the at least one said water-proof connector assembly (1) includes two said water-proof connector assemblies (1).

* * * * *